US006826634B2

(12) United States Patent
Nath

(10) Patent No.: US 6,826,634 B2
(45) Date of Patent: Nov. 30, 2004

(54) EXTENDED MESSAGE BLOCK FOR NETWORK DEVICE DRIVERS

(75) Inventor: Raman Viswa Nath, Cherrybrook (AU)

(73) Assignee: Sun Microsystems, Inc., Santa Clara, CA (US)

( * ) Notice: Subject to any disclaimer, the term of this patent is extended or adjusted under 35 U.S.C. 154(b) by 69 days.

(21) Appl. No.: 10/167,072

(22) Filed: Jun. 10, 2002

(65) Prior Publication Data

US 2003/0236929 A1 Dec. 25, 2003

(51) Int. Cl.$^7$ ............................................. G06F 13/28
(52) U.S. Cl. .......................... 710/22; 710/23; 710/24; 710/30; 710/33; 709/201; 709/212; 709/217; 709/220; 709/221; 709/233; 709/236; 711/100
(58) Field of Search ........................ 710/22, 23, 24, 710/30, 33; 709/201, 212, 217, 220, 221, 233, 236; 711/100

(56) References Cited

U.S. PATENT DOCUMENTS

| | | | | |
|---|---|---|---|---|
| 5,950,211 A | * | 9/1999 | Shealy | 707/204 |
| 6,167,423 A | * | 12/2000 | Chopra et al. | 718/100 |
| 6,247,060 B1 | * | 6/2001 | Boucher et al. | 709/238 |
| 6,636,523 B1 | * | 10/2003 | Lau et al. | 370/415 |
| 2002/0009075 A1 | * | 1/2002 | Fesas Jr. | 370/363 |
| 2002/0194332 A1 | * | 12/2002 | Connor | 709/225 |

* cited by examiner

*Primary Examiner*—Jeffrey Gaffin
*Assistant Examiner*—Angel L. Casiano

(57) ABSTRACT

The present invention manages memory buffers in network device drivers in a flexible operating system (e.g., the Solaris operating system) that increase performance of the operating system at high throughputs with no detriment to the flexible nature of the operating system. Embodiments of the present invention reuse the (same) allocated and dma_binded memory buffers again and again, eliminating the repeated memory management of each data packet. In one embodiment, an rx-descriptor ring is treated as a true circular ring. A new data structure named rxbuffer_id is also defined along with a device-freemsg( ) function. In another embodiment, a device driver allocates and links a memory block (e.g., a rxbuffer_id data structure) with a message block at the time of allocating the message block for relocating incoming data packets. The memory block contains all the needed information for reuse of the message block. In a further embodiment, the device-freemsg( ) function is called by the operating system utilizing the db_lastfree field of the dblk_t. The performance of the network device driver using the present invention is thus improved. The improvement in performance applies to all data packet sizes because CPU processing time is reduced. Moreover, the performance gain is further improved when the host machine (having the operating system using embodiments of the present invention) is used to route data packets because, for example, as the network driver of the host machine, it does not need to do any further copying and ddi_dma_addr_binding to route a received data packet.

24 Claims, 19 Drawing Sheets

```
/*
 * Message block descriptor
 */
typedef struct msgb {
        struct  msgb    *b_next;
        struct  msgb    *b_prev;
        struct  msgb    *b_cont;
        unsigned char   *b_rptr;
        unsigned char   *b_wptr;
        struct  datab   *b_datap;
        unsigned char   b_band;
        unsigned char   b_ftflag;       /* flow trace flag */
        unsigned short  b_flag;
        queue_t         *b_queue;       /* for sync queues */
} mblk_t;
```

Figure 1

```
typedef struct datab {
        frtn_t      *db_frtnp;
        unsigned char *db_base;
        unsigned char *db_lim;
        unsigned char db_ref;
        unsigned char db_type;
        unsigned char db_flags;
        unsigned char db_struioflag;
        void        *db_cache;   /* kmem cache descriptor */
        struct msgb *db_mblk;
        void        (*db_free)(struct msgb *, struct datab *);
        void        (*db_lastfree)(struct msgb *, struct datab *);
#ifndef _LP64
        void        *db_pad;    /* unused -- needed for alignment */
#endif
        unsigned char *db_struiobase;
        unsigned char *db_struiolim;
        unsigned char *db_struioptr;
        union {
                double enforce_alignment;
                unsigned char data[8];
                unsigned u16:16;    /* used to store hw-calculated cksum */
                /*
                 * Union used for future extensions (pointer to data ?).
                 */
        } db_struioun;
        fthdr_t     *db_fthdr;
        ftflw_t     ***db_ftflw;
        uid_t       db_uid;      /* Effective user id */
/* Limit id for SRM, reserved for future use. */
        uid_t       db_lid;
} dblk_t;
```

Figure 2

EXTENDED MESSAGE BLOCK FOR NETWORK DEVICE DRIVERS

BACKGROUND OF THE INVENTION

1. Field of the Invention

The present invention relates to the field of data delivery in a computer network system and, in particular, to a method and apparatus for managing memory buffers for network device drivers.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

Sun, Sun Microsystems, the Sun logo, Solaris and all Java-based trademarks and logos are trademarks or registered trademarks of Sun Microsystems, Inc., in the United States and other countries. All SPARC trademarks are used under license and are trademarks of SPARC International, Inc., in the United States and other countries. Products bearing SPARC trademarks are based upon an architecture developed by Sun Microsystems, Inc.

2. Background Art

Recent years have witnessed exponential growth in networking technologies such as Fast Ethernet, Gigabit Ethernet, and Asynchronous Transfer Mode (ATM), which have significantly increased the speed and bandwidth of computer networks. Newer and newer technologies have evolved which are capable of delivering data upwards of one Gigabit per second (Gbps). As networks continue to evolve and new technologies arise, it has become apparent that although networks are capable of delivering data at high rate, the operating system (especially the network device drivers) of the host machine is incapable of delivering that data to the application layer with the same speed and efficiency. It has been reported that the typical network device driver (e.g., the Gigabit Ethernet or GE driver) is not able to provide a sustainable speed beyond 350 MBPS (i.e., 35% of theoretical 1 Gbps that it is supposed to sustain). Thus, the operating systems of a computer network system have become a bottleneck in terms of high performance.

In a typical operating system of a network host machine (such as the Sun Solaris Operating System), network data is delivered to the application layer through a modular subsystem. In the subsystem, data is passed from one module to another with the help of a standard message block. As per the current implementation, one of the modules comprises a network device driver. The network device driver assembles a standard message block for an incoming data packet. The subsystem then fills the data packet into the message block. Once the message block has been filled up with the data packet, the driver then passes the message block to the next module in the subsystem. Once the subsystem delivers the data in the message block to the application layer, the subsystem destroys that message block. The process of creating a standard message block and then destroying that message block for each and every received data packet is found to consume a lot of Central Processing Unit (CPU) resources. This results in a severe penalty in performance of the host system.

Accordingly, it would be advantageous and desirable to provide a method and apparatus that eliminate the need for repeated construction/destruction of a standard message block for each and every received data packet.

SUMMARY OF THE INVENTION

The present invention manages memory buffers in network device drivers in a flexible operating system (e.g., the Solaris operating system) that increases performance of the operating system at a high throughput with no detriment to the flexible nature of the operating system. In accordance with the teachings of the present invention, a standard message block is extended so that it does not have to be destroyed when the processing of its corresponding data packet is completed. The extended message block can be reused to carry another data packet. Thus, by eliminating the need to create a standard message block, and to bind/unbind (with direct memory access (DMA) handlers) and destroy that message block for each and every data packet (regardless of how small or large that packet is), the present invention greatly improves the efficiency and speed of data processing within a computer network system.

In one embodiment of the present invention, a computer network system includes a network for transmitting a data packet, a first module for receiving the packet, and a second module for processing the data packet. The first module is connected with the network. An operating system is connected with the first and second modules. A message block is used to carry the data packet from the first module to the second module. The message block is assembled by a network device driver module within the operating system and can be reused to carry another data packet from the first module to the second module upon delivery of the data packet to the second module.

In another embodiment of the present invention, a method is developed for managing memory buffers in a computer network system. In this method, a data packet is received from a network. A message block is then assembled for the data packet. The data packet is then filled into the message block. The filled message block is then carried within a network subsystem until the data packet has been delivered to an application layer. The message block is then used to carry another data packet.

In a further embodiment of the present invention, a computer network system includes a network for transmitting a data packet and an operating system having a modular subsystem. A message block is used to carry the data packet within the modular subsystem. A network device driver module within the modular subsystem is used to assemble the message block. An application layer is connected with the network via the operating system. The message block contains an extension that allows the message block to carry another data packet upon delivery of the data packet to the application layer, and the data packet is delivered to the application layer through the subsystem.

A more complete understanding of the present invention, as well as a realization of additional advantages and objects thereof, will be afforded to those skilled in the art by a consideration of the following detailed description of the embodiment. Reference will be made to the appended sheets of drawings which will first be described briefly.

BRIEF DESCRIPTION OF THE DRAWINGS

The drawings illustrate the design and utility of embodiments of the invention. The components in the drawings are not necessarily to scale; instead, emphasis is placed on illustrating the principles underlying the embodiment. Moreover, features, aspects and advantages of the present invention will become better understood with regard to the following description, appended claims and accompanying drawings where:

FIG. 1 illustrates an exemplary data structure for a message block in accordance with one embodiment of the present invention;

FIG. 2 illustrates another exemplary data structure for the message block in FIG. 1;

DETAILED DESCRIPTION OF THE INVENTION

Figure 3A:
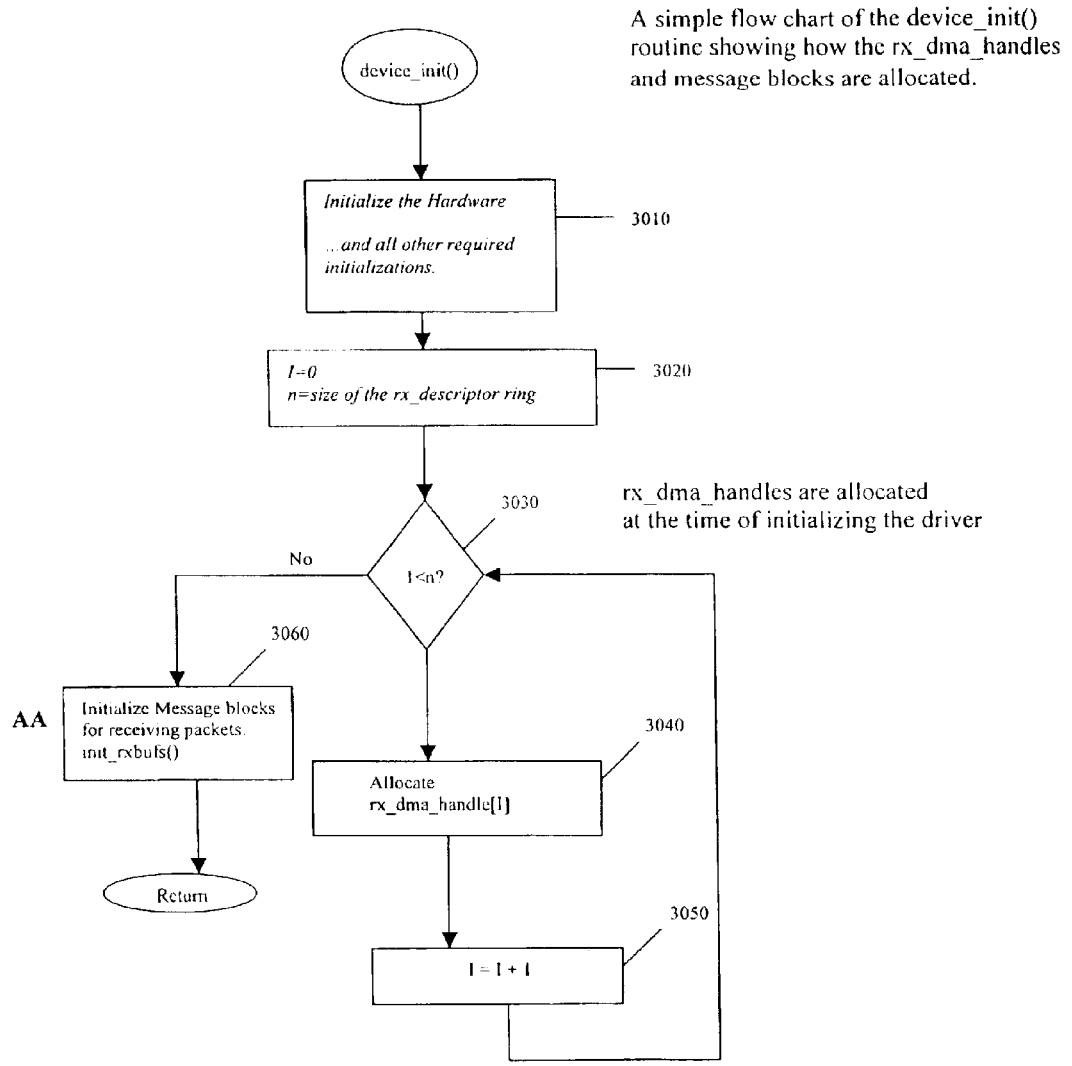
FIG. 3A is an example flow chart of a device initialization routine in a computer network system.

In the following description, numerous specific details are set forth to provide a more thorough description of embodiments of the invention. To one skilled in the art, however, it is apparent that the invention may be practiced without these specific details. Well-known features have not been described in detail so as not to obscure the invention.

Multi-Layer Architecture

An embodiment of the invention can be implemented within a multi-layer architecture computer system. In the multi-layer architecture, a client or server runs software (or many programs). As far as a user (or the client) is concerned, the user is running several application programs on the client or server. But, for the client or server, in addition to each of these application programs, there is an operating system. This operating system lies below the application programs. It is this operating system that makes the application programs work. Accordingly, the operating system is differentiated from the user applications, and this differentiation makes up the two layers in the multi-layer architecture: the user (or application) layer, and the operating system (or kernel) layer.

Operating System

With the advent of high-speed network technologies, such as Fast Ethernet, Gigabit Ethernet, and Asynchronous Transfer Mode (ATM), the speed and bandwidth of computer networks have significantly increased. Network technologies are now capable of delivering data upward of one Gigabit per second. As networks continue to evolve and new technologies arise, it is apparent that although networks are capable of delivering data at a high rate of speed, the operating systems (especially the network device drivers) of the host machine are incapable of delivering that data to the application layer with the same speed and efficiency. This is due at least in part to the fact that the typical network device driver consumes a lot of Central Processing Unit (CPU) resources. Thus, operating systems have become a bottleneck in terms of high performance for the typical computer network.

For example, in the Sun Solaris Operating System, the network data is delivered to the application layer through a STREAMS subsystem. The data from the application layer to the network is also delivered through the STREAMS subsystem. The STREAMS subsystem is a well-structured and flexible modular subsystem with a dynamically loadable stack of modules. Network stacks are built easily by the STREAMS subsystem architecture, with a network device driver at the bottom, a Stream Head at the top, and Transmission Control Protocol/Internet Protocol (TCP/IP) in between. In the STREAMS subsystem, data is passed from one module to another with the help of a standard message block. Message blocks are defined by a mblk_t and a dblk_t data structure (refer to FIG. 1 for an exemplary mblk_t and to FIG. 2 for an exemplary dblkt). Specifically, data (or messages) with the subsystem are passed from module to module (or, layer to layer) using a message block. This message block is comprised of an mblk and a dblk. mblk is defined by the structure "mblk_t" (for an example, see FIG. 1). Once allocated, mblk is a contiguous block of memory. In addition to many parameters, this mblk_t has a pointer (i.e., address of) to another data structure called "dblk_t" (for an example, see FIG. 2). dblk (this term is derived from "data block") is another contiguous block of memory. mblk and dblk may not be sitting next to each other in memory, but may be wide apart (or scattered). However, there cannot be an mblk without a linked dblk. In addition to various parameters and pointers, this dblk holds the space for data (or data packet).

In the context of the present invention, this linked mblk/dblk is referred to as the message block, which is the carrier of messages (or data) from module to module. Provisions in the STREAMS subsystem also exist for copying and duplication of these message blocks. In addition, the subsystem also allows for a plurality of mblks to be linked to a single dblk at the time a message block is duplicated.

If the network device driver wants to receive a data packet from the network's physical layer (e.g., from the external wire), it has to first assemble a message block. In the context of the present invention, assembling refers to allocating or reserving the needed mblk/dblk in memory.

Once the device driver allocates this message block, one of the mblk's fields holds the starting address of the location in dblk where the data is to be filled. This is the db_rptr (or "*b_rptr" in FIG. 1) within the mblk_t data structure (see FIG. 1). The value of db_rptr is the address of the starting point of the data within dblk. The driver also provides a command to the direct memory access (DMA) engine to fill the incoming data packet in the location starting at db_rptr. However, since the value of db_rptr is a virtual address and the external DMA engine that must fill the data packet is an actual physical location within the memory (i.e., an actual physical address in the memory), the driver has to convert this virtual address to the physical address (in the memory) and pass that address to the DMA engine. In the context of the present invention, this process of computation (or conversion) by the driver is referred to as "DMA address binding with DMA handles."

The driver then places this physical address (in addition to some other flag values) in another location called the descriptor ring. Each of the pieces of information about a message block that the driver places in the descriptor ring is called a descriptor. The driver can place a number of such descriptors in the ring, one after the other.

The DMA engine then reads the descriptor and gets the physical address where the data is to be placed. The engine then fills one data packet in one message block. Once the DMA engine fills a message block with an incoming packet, it tells (interrupts) the driver that that message block is ready for processing. The DMA engine would have already updated some flag fields of the descriptor that indicate the condition of the packet (e.g., good/bad, number of bytes received in that packet, etc.).

The driver next reads the descriptor back from the descriptor ring, examines the flag field, and processes that message block. If it finds that the packet is good and valid, it sends that message block to the next upper layer of the STREAMS for processing. All the information required for the upper layers to process this message block is in the various fields of the mblk/dblk and in the data packet. Note that the data packet is now within dblk.

In the context of the present invention, the term data packet (that the DMA engine fills in a message block) is referred to as a stream of bytes in a predetermined order and standard. The order and standard depend on the protocols used in that network. If the data transfer is in TCP/IP through an Ethernet, then the format of the data packet is defined. This received data packet will have a few bytes of Ethernet header followed by IP header followed by TCP header followed by the actual data that the application (the sender) is sending. Since the data packet is a continuous (and contiguous) stream of bytes, the bytes are sent in order (from the beginning to the end) within a packet (which now sits in the dblk of the message block). Thus, when a message block is sent to the upper layers, each layer will look at the data packet and do the needed processing. The headers of each data packet contain the needed information for processing by each and every layer (module) of the STREAMS subsystem.

FIGS. 3A–E are flow charts that illustrate an implementation of the STREAMS subsystem. The numbers set out in the parentheses below refer to the steps of the flow chart illustrated in FIGS. 3A–E.

FIG. 3A is a simple flow chart showing how an initialization routine (e.g., a "device_init( )" routine) allocates DMA handlers (e.g., "rx_DMA_handles") and message blocks. The routine initializes any hardwares (including the network device driver and any other systems within the subsystems) that need initialization (3010). The significance of this flow chart is that in this implementation the DMA handlers are allocated (in steps 3020, 3030, 3040, and 3050) at the time the driver is initialized. Once enough DMA handlers have been allocated (i.e., I<n), the routine begins to initialize message blocks for receiving data packets (in step 3060).

Figure 3B:
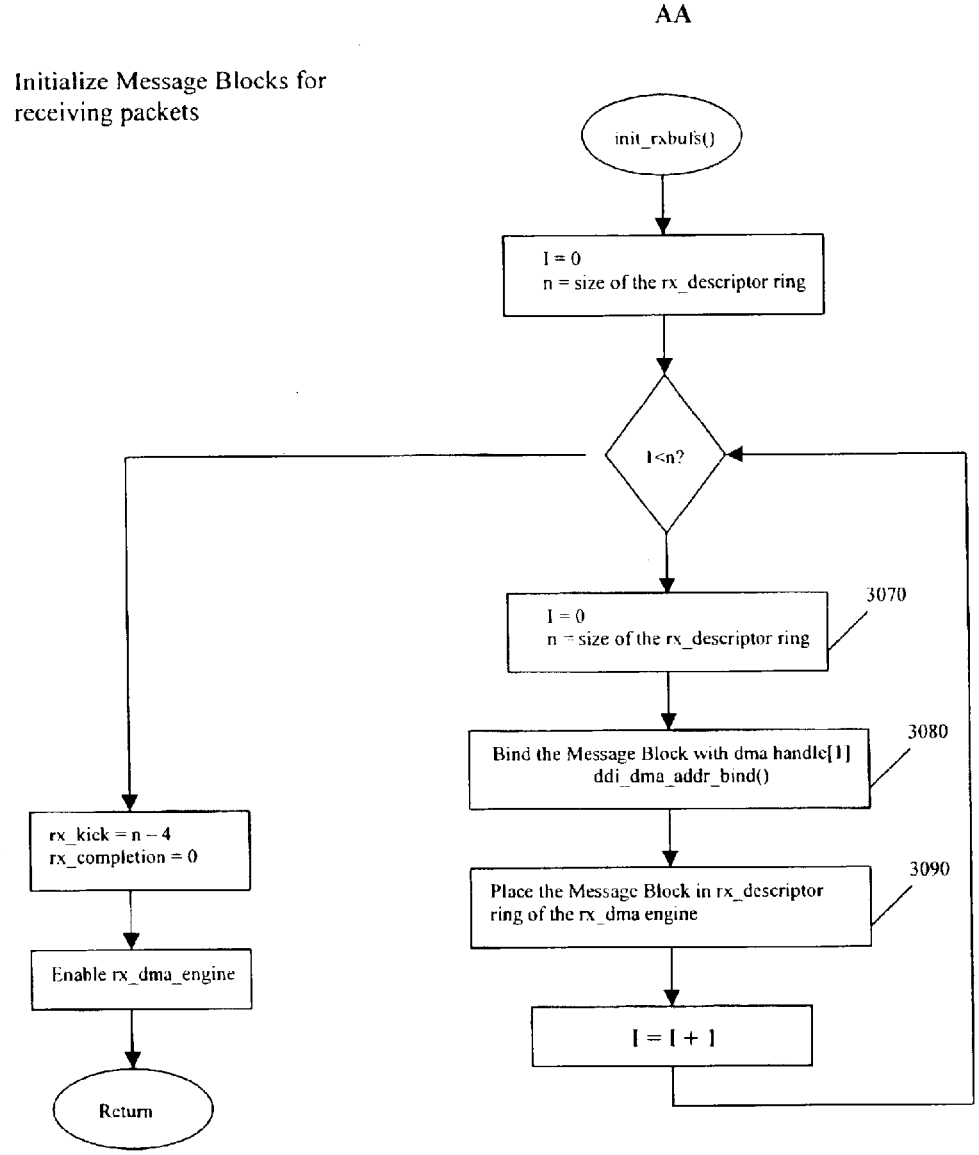
FIG. 3B is an example flow chart of the initialization of message blocks for receiving data packets in the computer network system of FIG. 3A.

Referring now to FIG. 3B, the network device driver now assembles a standard message block for the incoming data packet and passes that message block to the next upper layer in the STREAMS. As per the present implementation, while assembling the message block for an incoming packet, the driver allocates a new memory buffer (fixed size), call allocb( ) (3070). The driver then binds this memory to a corresponding DMA handler by calling ddi_dma_addr_bind( ), and gets the dma_address for this memory buffer (3080). It is this dma_address that is placed in the rx_descriptor of the rx_descriptor ring of the DMA engine (3090). Once the DMA engine fills up this buffer with an incoming packet, it interrupts the driver.

Figure 3C:
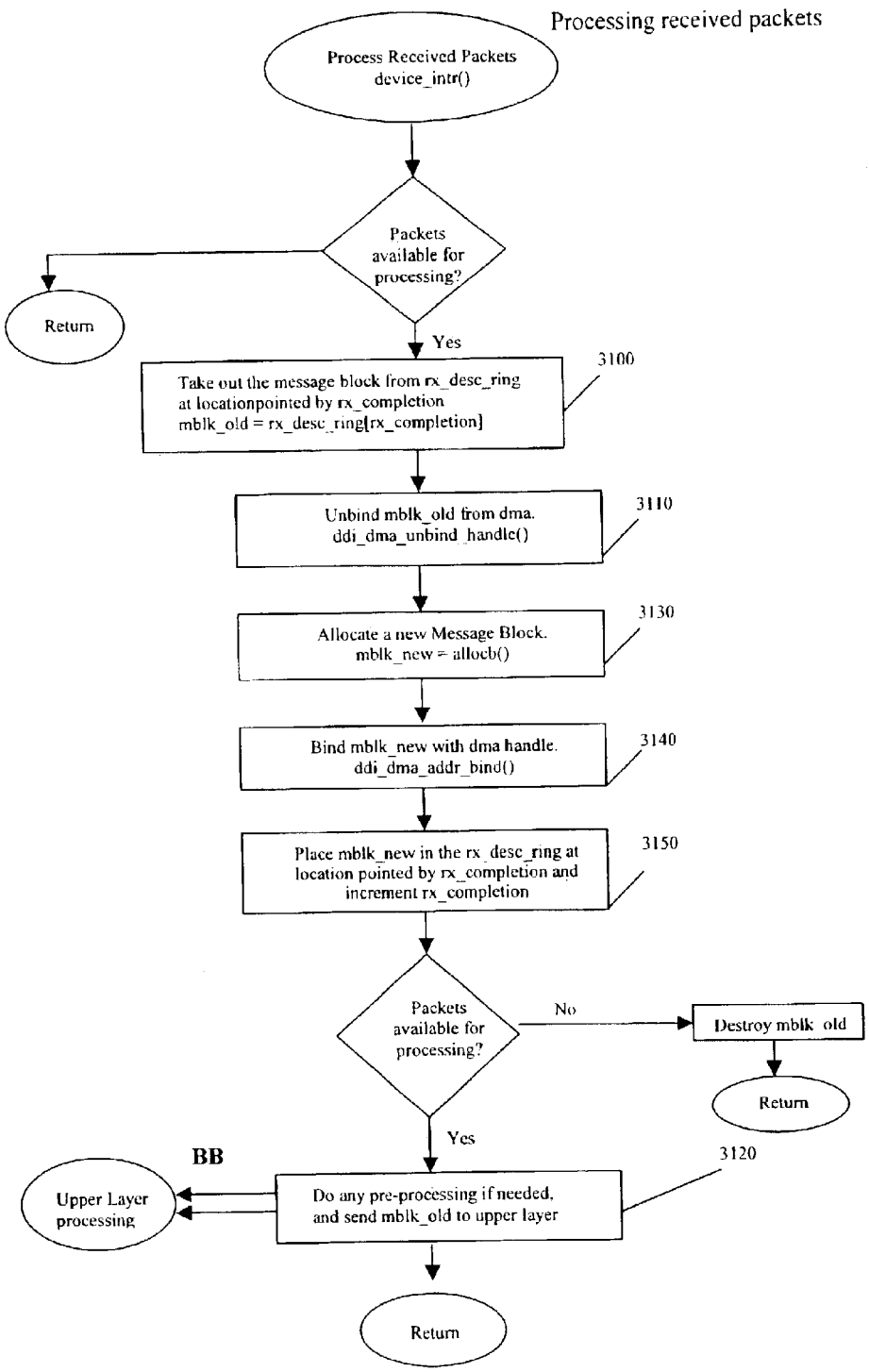
FIG. 3C is an example flow chart of processing received data packets in the computer network system of FIG. 3A.

Referring also now to FIG. 3C, upon an interrupt, the driver removes this buffer from the rx_descriptor ring, unbinds this from DMA by calling ddi$_{dma}$_addr_unbind ( ), and passes the standard message block to the next upper layer of the STREAMS (in steps 3100, 3110 and 3120). In addition, the driver assigns a new message block in the rx_descriptor ring by calling allocb( ) and ddi_dma_addr_bind( ) (in steps 3130, 3140, and 3150).

Figure 3D:
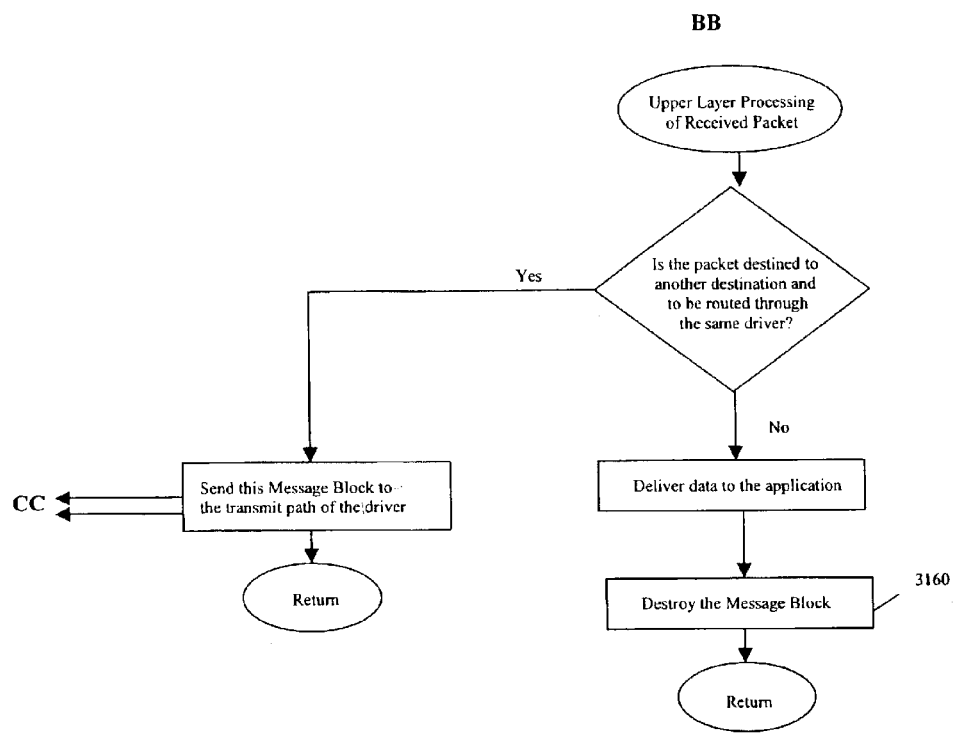
FIG. 3D is an example flow chart of upper layers (modules) processing the data packets in the computer network system of FIG. 3C.
Figure 3E:
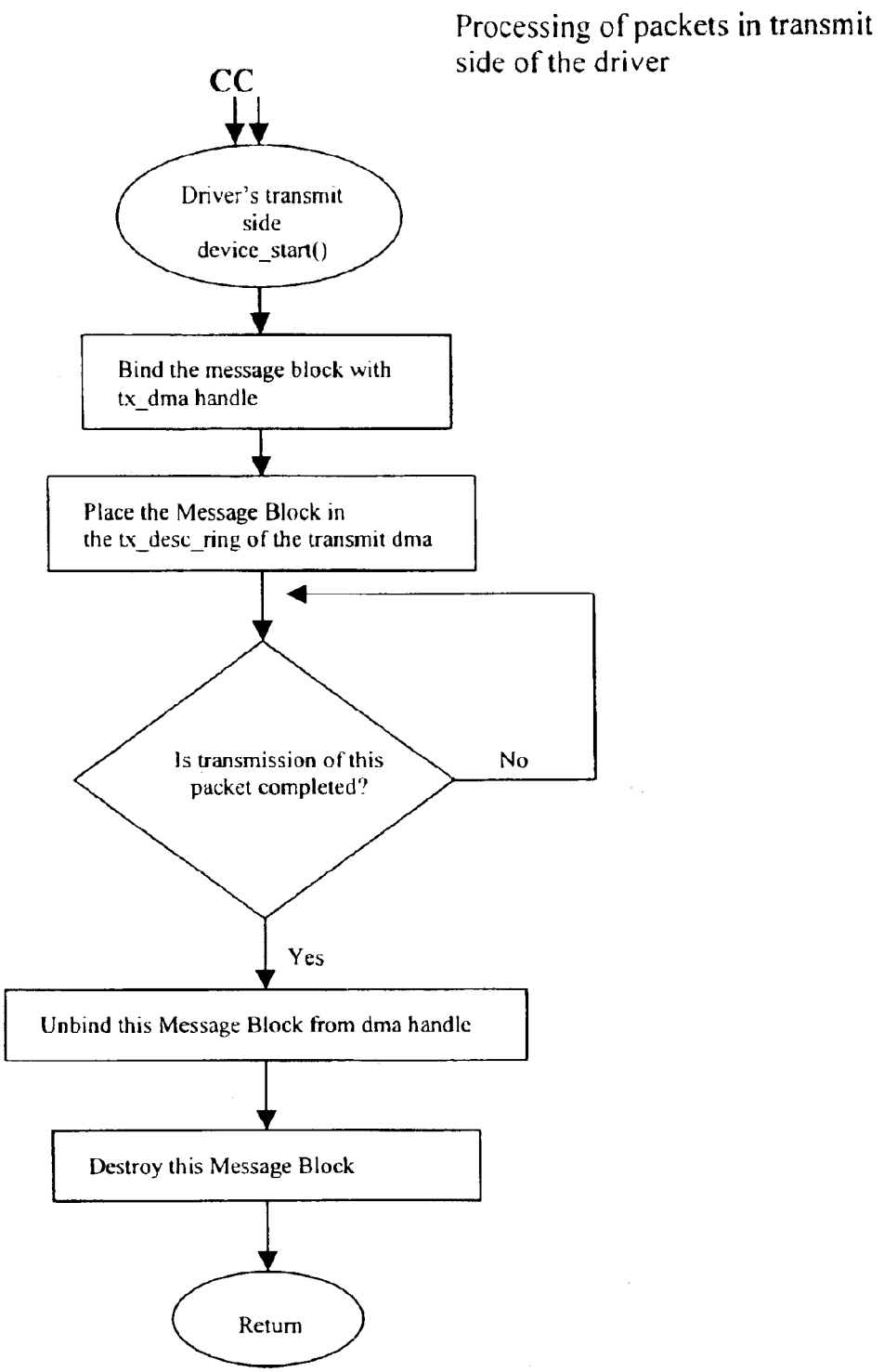
FIG. 3E is an example flow chart of the processing of data packets in a transmit side of the computer network system of FIG. 3D.

Referring now to FIG. 3D, once the STREAMS subsystem delivers the packet to the application layer, it destroys that message block by calling freemsg( ) (step 3160). Referring also to FIG. 3E, the data from the application layer to the network is also transmitted through the STREAMS subsystem in an implementation similar to those already described with respect to FIGS. 3A–D.

The process of creating a standard message block and dma_binding/unbinding, and then destroying that message block for each and every packet (regardless of how small or large the packet) is found to consume a lot of CPU resources. At a high data throughput, this degrades the performance of the system significantly. Accordingly, an implementation that may completely eliminate the need for continuous allocation of memory and dma_addr_bind/unbind is developed by the present inventive entity.

Embodiments of the present invention are directed to a method and apparatus that eliminates the need for construction/destruction of memory buffers for each and every received data packet. Specifically, certain embodiments use the same allocated memory buffers again and again to receive incoming data packets. A reuse extension linked with a standard message block and a new processing scheme is also presented.

Reusable Message Block

In one embodiment of the present invention, a buffer identification data structure (i.e., an extension or a "rxbuffer_id") is attached with an allocated message block. This identification data structure allows the same message block to be used again and again without the need for repeated construction/destruction of new message blocks. This saves a lot of CPU resources, and improves the speed at which a network subsystem (e.g., a STREAMS subsystem) can deliver data packets to the application layer.

In another embodiment of the present invention, a standard message block is extended so that it does not have to be destroyed when the processing of the packet is completed. This embodiment eliminates the need to continuously allocate and destroy message blocks for each and every received data packet, which takes a lot of time. The message block is a "carrier" of the data packet. The embodiment uses the same "carrier" (i.e., the same message block) to carry another data packet. Extension or reuse of the standard message blocks can be achieved by linking a memory block (e.g., "rxbuffer_id") with the message block.

In the context of the above embodiment, a memory block and a message block are not the same. A memory block is a block of data space in memory, and a message block is one or more blocks of data in memory either sitting in consecutive locations or scattered. In a more specific embodiment of the present invention, an mblk linked to a dblk is referred b as a message block or a standard message block. Each of the mblk and dblk (and rxbuffer_id) may be scattered in memory. Once the linking is completed by the present embodiment, the new message block is mblk/dblk/rxbuffer_id. In the present invention, this linked structure is referred to as a message block or an extended message block. The information that is placed in rxbuffer_id is needed to reuse this message block to receive another data packet.

In one embodiment of the present invention, a change is made in the method for how memory blocks are allocated and processed. The embodiment reuses the same allocated message blocks again and again to receive new packets. Once the network subsystem (e.g., the STREAMS subsystem) has delivered a packet to the application layer, it does not destroy that message block, but reuses the message block by giving the block back to the device driver so that the driver can place the block back in a buffer ring (e.g., a rx_descriptor ring of the DMA engine) to receive another packet. Accordingly, in a more specific embodiment, the device driver only needs to allocate a new message block when the number of empty buffers in the rx_descriptor ring falls below a certain threshold as a result of the upper layers in the STREAMS queuing up the messages without processing them.

Figure 4:
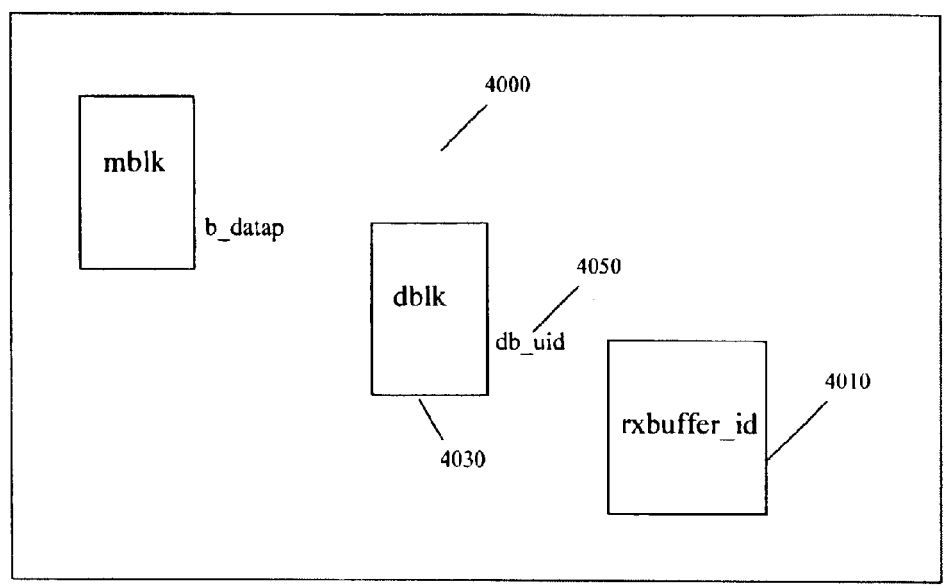
FIG. 4 is a block diagram of an example embodiment of a message block for carrying data packets in accordance with one embodiment of the present invention.

In one embodiment, an extension is linked with a standard message block in order to reuse the message block. The extension is a buffer ID linked with the message block that is allocated by the device driver. Referring now to FIG. 4, a small block of memory 4010 (rxbuffer_id_t data structure) is allocated and linked to the message block 4000. The rxbuffer_id 4010 is linked to the dblk data structure 4030 via the db_uid field 4050 of the dblk data structure 4030.

In order to link rxbuffer_id 4010 through db_uid 4050, the following two conditions should be met:

1. The number of bits assigned to db_uid field 4050 (i.e., the size of db_uid) should be the same as the size of a memory address of the operating system (or kernel). So, in a 32-bit kernel, this must be 32 bits, and in a 64-bit kernel, this must be 64 bits.
2. db_uid field 4050 shall remain an owner field, and the owner (the allocator) of the dblk 4030 shall be the only module authorized to modify this field 4050.

Note: In certain embodiments when db_uid field 4050 cannot be used for the above purposes, a new field in dblk_t data structure 4030 may be added within the dblk 4030 for the purpose of extending the message block for reuse.

rxbuffer_id Data Structure

The rxbuffer_id data structure 4010 is used for saving some of the initial parameters of the message block 4000 so that it can be reused. An exemplary structure of this rxbuffer_id 4010 is shown below in Table 1.

TABLE 1

Exemplary structure of rxbuffer_id

```
typedef struct rxbuffer_id {
    struct rxbuffer_id    *buffid_next;
    struct rxbuffer_id    *buffid_prev;
    dblk_t                *b_datap;
    ddi_dma_handle_t      dma_handle;
    uint64_t              dmac_laddr;
    void                  (*db_lastfree)(mblk_t *mp, dblk_t *dbp);
    unsigned char         *base_rptr;
    void                  *devp;
    uint32_t              flag;
} rxbuffer_id_t;
```

Referring now to Table 1, the definition and purpose of each field of the exemplary rxbuffer_id 4010 is listed as follows:
buffid_next: Pointer to the next rxbuffer_id in the doubly-linked list of rxbuffer_ids
buffid_prev: Pointer to the previous rxbuffer_id in the doubly-linked list of rxbuffer_id's
(Note: The above two fields are used to detach the network device driver when the application layer that is processing the message block does not release (probably because the application layer is hung) the message block.)
b_datap: This field is a back-pointer to the dblk data structure
dma_handle: DMA handle for this memory buffer
dmac_laddr: DMA address returned in the dma_cookie when binding this memory to dma
db_lastfree: Pointer to the function to free (destroy) this dblk. The address that is returned in the db_lastfree field of the dblk data structure by alloeb( ) is expected to be saved at this location. This allows the address of device_freemsg( ) function to replace the db_lastfree of dblk.
base_rptr: Initial value of the b_rptr of the mblk data structure is expected to be saved here
devp: Address of the private data structure of the network device driver may be kept in this field. As an example, in the case of Ethernet RIO Interface (ERI) driver (RIO is the name of the hardware chip used, 10/100 Megabits per second), this field will hold the address of the ERI protocol.
flag: This flag field can be used for a variety of purposes. One of the uses is to indicate that this buffer is sent up to the upper layers of the STREAMS.

FIGS. 5A–G are flow charts that illustrate an implementation of the STREAMS subsystem that reuses its message blocks. The numbers set out in the parentheses below refer to the steps of the flow chart illustrated in FIGS. 5A–G.

Figure 5A:
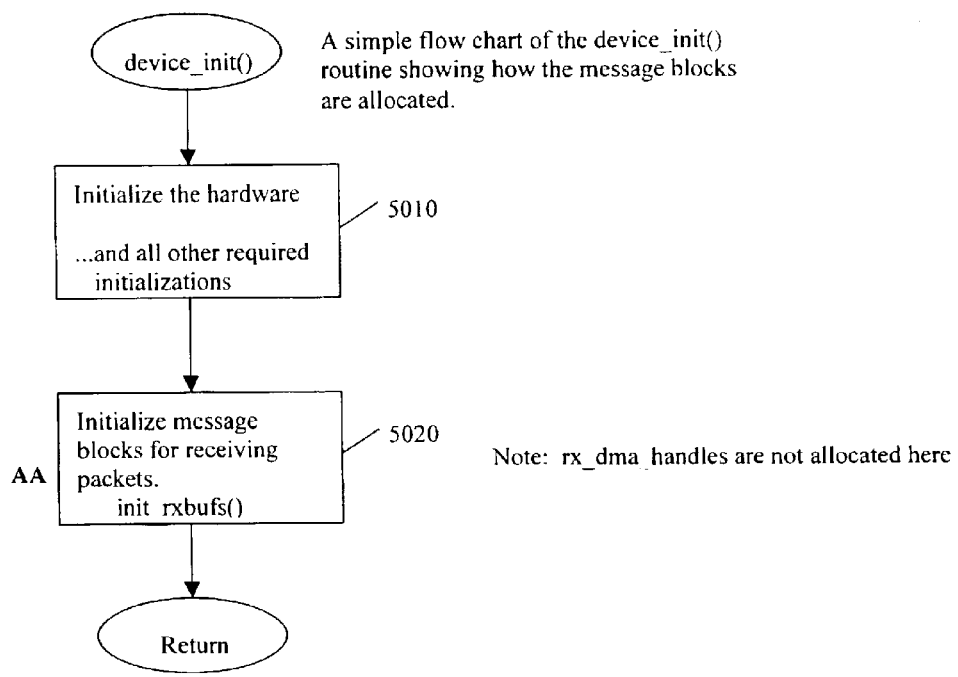
FIG. 5A is an example flow chart of a device initialization routine in accordance with a computer network system embodiment of the present invention.
Figure 5B:
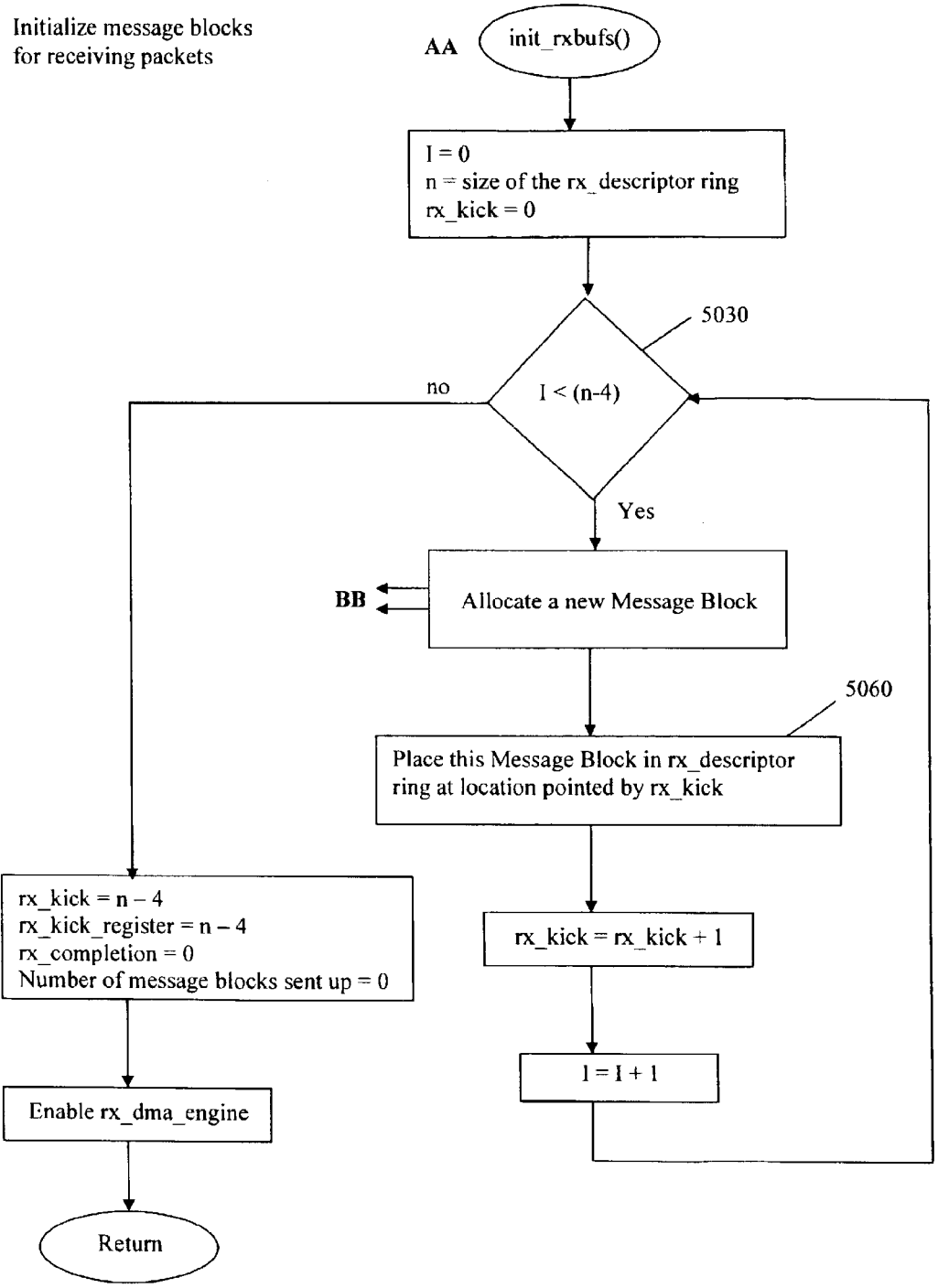
FIG. 5B is an example flow chart of the initialization of message blocks for receiving data packets in the embodiment of FIG. 5A.
Figure 5C:
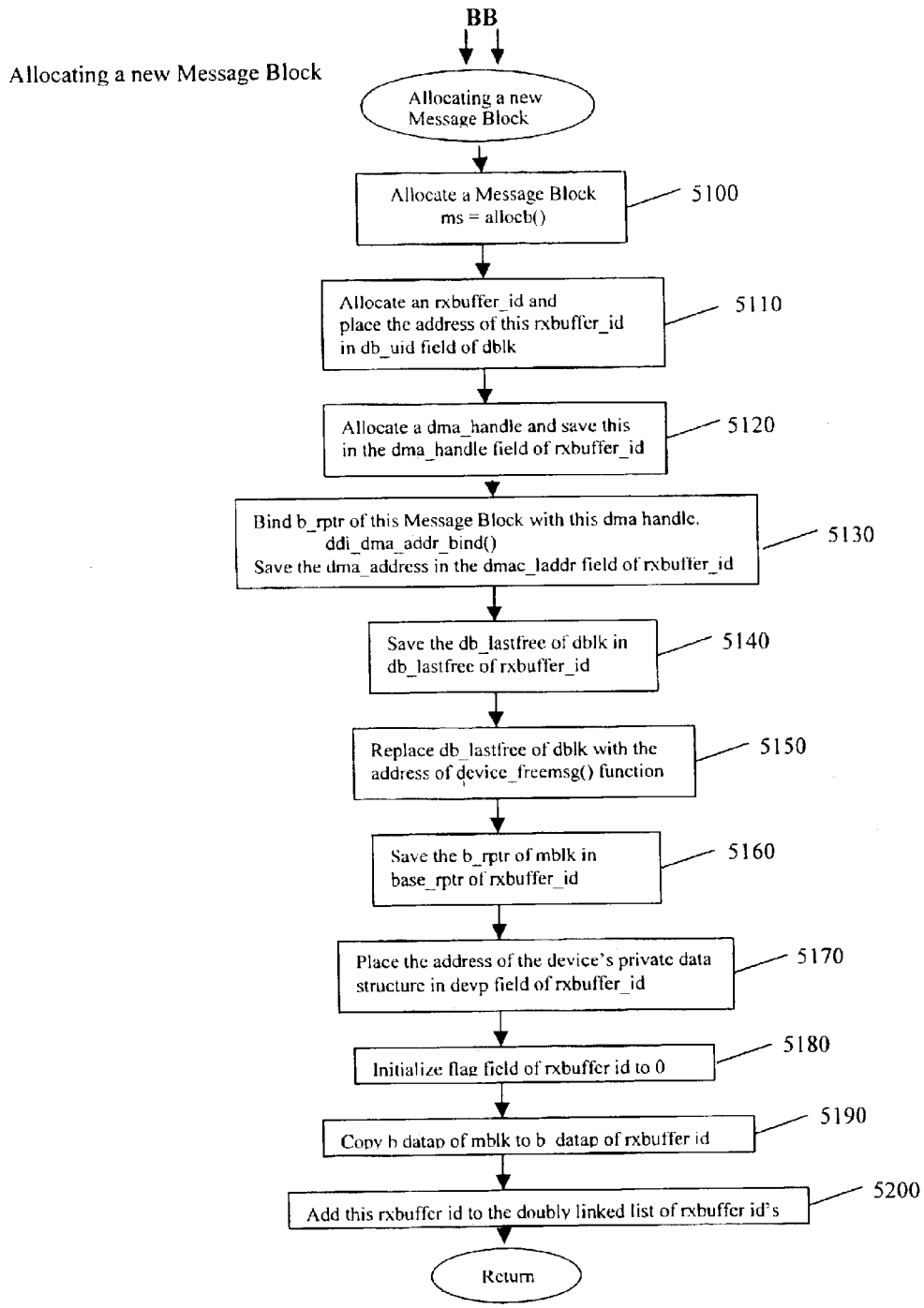
FIG. 5C is an example flow chart of allocating a new message in the embodiment of FIG. 5B.

FIG. 5A is a simple flow chart showing how an initialization routine (e.g., a "device_unit( )" routine) allocates DMA handlers (e.g., "rx_dma_handles") and message blocks. The routine initializes any hardwares (including the network device driver and any other systems within the subsystems) that need initialization (5010). The significance of this flow chart is that in this embodiment of the present invention the DMA handlers are not allocated at the time the driver is initialized. Instead, the routine begins to initialize message blocks (in step 5020) to receive data packets once the hardware initialization (i.e., step 5010) is completed.

Allocating Message Blocks

The network device driver is the only module that can allocate a new message block for an incoming packet. Any other module in the STREAMS subsystem may duplicate or copy this message block. The device driver allocates a fixed number of message blocks at the time of intializing the hardware. The number of message blocks allocated at this time should be less than n blocks (see 5030), where n is the maximum size of the rx_descriptor ring.

In one embodiment, n4 blocks are allocated because of a hardware requirement, such as the hardware requirement for an ASIC (Application Specific Integrated Chip) that sits on the HBA (Host Bus Adaptor).

The network device driver should treat the rx_descriptor ring as a circular ring with a tail (rx_kick) and a head (rx_completion). When a message block is placed in the ring, it should be placed at the location pointed by rx_kick (e.g., 5060 in FIG. 5B or 5080 in FIG. 5E), and when a message block is to be removed from the ring, it should be removed from the location pointed by rx_completion. rx_completion_register, on the other hand, points to the location where the DMA engine is going to fill up the next incoming data packet. All the message blocks from rx_completion to rx_completion_register are filled by the DMA engine and are ready for reading and processing by the driver. All the message blocks from rx_completion_register to rx_kick are unfilled and empty, ready for use by the DMA engine.

Device driver may also allocate new message blocks whenever need arises. This need for extra message blocks may arise when any of the modules in the STREAMS is queuing up the messages without processing. For example, the driver sends the received data packet to the next module (usually IP) in the STREAM subsystem for processing. The IP module may, then, send it to the TCP module and so on until the data is delivered to the application program (application layer). In a multithreaded, multi-processor system, there are many threads running at the same time processing various applications. It is likely that the IP layer (for example) is unable to get CPU resources at the time when the driver is sending a packet to it (or, maybe, some condition is blocking it). Thus, the packet is queued until the IP nodule gets CPU resources. At the same time, the driver keeps on sending packets and they also get queued in the upper layer. While this process is occurring, the driver's rx_descriptor ring is getting empty because the upper layers are not processing the packets. (Note: The system does not reuse the message blocks in the rx-descriptor ring until the upper layers process the packets that are sent to them.) Accordingly, when the driver detects that the descriptor ring is getting below the pre-decided threshold, it will allocate fresh message blocks (extra). The device driver can detect this condition by watching the number of descriptors in the rx_descriptor ring.

The pre-decided threshold should be decided by the size of the descriptor ring and the speed of the network. A performance tuning should be done to determine this threshold value. For example, in one embodiment, a value of about 5 to 10% of the size of the rx_descriptor ring can be used as the threshold value. In another embodiment using an ERI driver, a threshold value that is 80 descriptors below the size of the rx-descriptor ring is used. For example, if the size of the descriptor ring is 512 descriptors (i.e., total number of descriptors that the ring can maximally hold), the threshold value used is 432 descriptors. Thus, in this example, when the number of descriptors in the ring goes below 432, the device driver will allocate extra message blocks.

At the time of allocating a new message block (and referring now to FIG. 5C), the following steps should be utilized:

1. Allocate a message block by calling allocb( ). This allocates mblk and dblk (5100).
2. Allocate memory for rxbuffer id by calling kmem_alloc( ) and place the address of this memory in db_uid field of the dblk (5110).
3. Allocate DMA handle by calling ddi_dma_alloc_handle( ), and place the handle in the dma_handle field of the rxbuffer_id (5120).
4. Call ddi_dma_addr_bind to bind b_rptr to the DMA, and get the DMA address from the dmac_laddress field of the dma_cookie. Place this address in the dmac_laddr field of the rxbuffer_id (5130).
5. Save the contents of the db_lastfree field of the dblk data structure in db_lastfree field of the rxbuffer_id (5140).
6. Replace the db_lastfree of the dblk by the address of the device_freemsg( ) function, so that when a STREAMS module calls freemsg( ), this device_freemsg( ) is executed (5150).
7. Save the b_rptr of the mblk in base_rptr of the rxbuffer_id (5160).
8. Place the address of the device's private data structure in devp of the rxbuffer_id (5170).
9. Initialize the flag field of rxbuffer_id to 0 (5180).
10. Copy b_datap of the mblk in b_datap field of rxbuffer_id (5190).
11. Add this rxbuffer_id at the head of the doubly linked list of rxbuffer_id's by properly updating buffid_prev and buffid_next. The driver may use a mutex at the time of adding a new rxbuffer_id to this list, and/or at the time of deleting an rxbuffer_id from this list (5200).

Once a message block is allocated and rxbuffer_id fields are filled, the message block can be placed in the rx_descriptor ring of the DMA engine (PUT_RMD). In addition, rx_kick is incremented when a message block is placed in the rx_descriptor ring, and the rx_kick_register gets updated (incremented by four) after four message blocks are placed in the rx_descriptor ring. In a multi-threaded kernel, it may be necessary to use a lock to read/write any parameter associated with rx_descriptor ring.

Processing of Descriptors in the Interrupt Service Routine

Figure 5D:
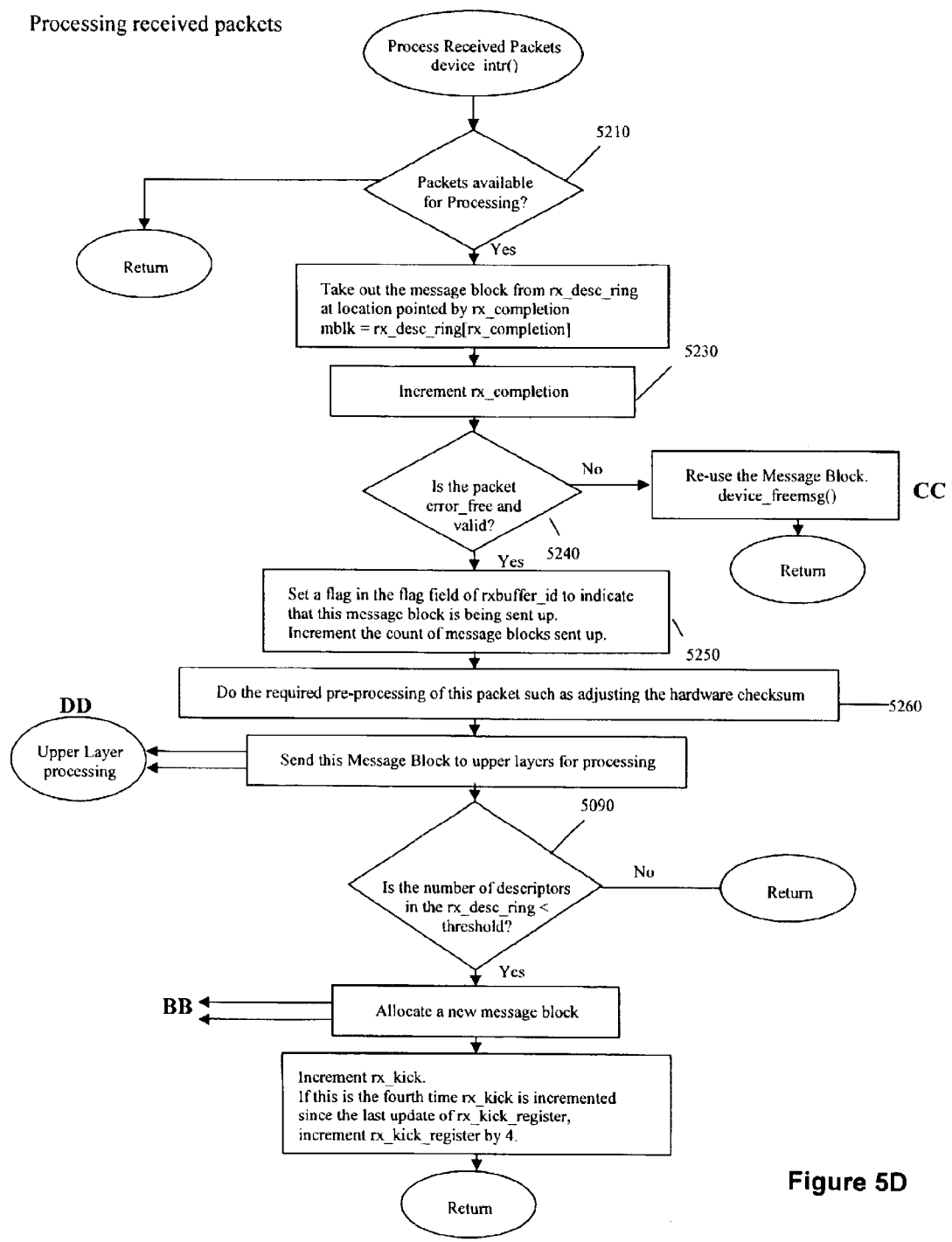
FIG. 5D is an example flow chart of processing received data packets in the embodiment of FIG. 5A.

The DMA engine fills up the message block (i.e., the area in the memory addressed by a descriptor of the message block) pointed by the rx_completion register. Once a message block (or buffer) is filled with a complete data packet (or, after filling a few message blocks, depending on the settings of the dma engine), the DMA engine interrupts the driver. At the time of an interrupt, all the message blocks from the location pointed by rx_completion to rx_completion_register are filled and ready for removing from the rx_descriptor ring for processing. Upon interrupt, device driver reads these message blocks starting location pointed by rx_completion. Referring now to FIG. 5D, the following are the steps that should be used in processing these message blocks.

1. Read the descriptor (message block) from the location pointed by rx_completion. If rx_completion has reached rx_completion register (indicated by the OWN bit of the descriptor flag), return from interrupt; if rx_completion has not reached rx_completion register, process the descriptor (5210).
2. Increment rx_completion (5230).
3. Check the rx_descriptor flag for any errors. If this packet has any errors, this packet cannot be sent up to the upper layers of the STREAMS. Reuse this message block by calling STREAM's freemsg( ). Since the db_lastfree field of the dblk of this message block has been replaced by the address of device_freemsg( ) function, calling freemsg( ) calls device_freemsg( ). As it will be clear from the discussions below, the device_freemsg( ) funcion is written to reuse the message block (5240).
4. Set a flag in the flag field of the rxbuffer_id to indicate that this message block is being sent up to the upper layers of the STREAMS subsystem. Also, increment a count in the driver's private data structure to indicate the number of message blocks that have been sent up (5250).

5. Do the required pre-processing of the packet such as adjusting the hardware checksum etc., and send this message block to the next upper layer of the STREAMS subsystem for further pocessing (5260).

6. Check the number of descriptors in the ring. If this is lower than a pre-decided threshold, allocate a new message block and place it in the rx_descriptor ring (5090).

Task of the Device Freemsg( )

Figure 5E:
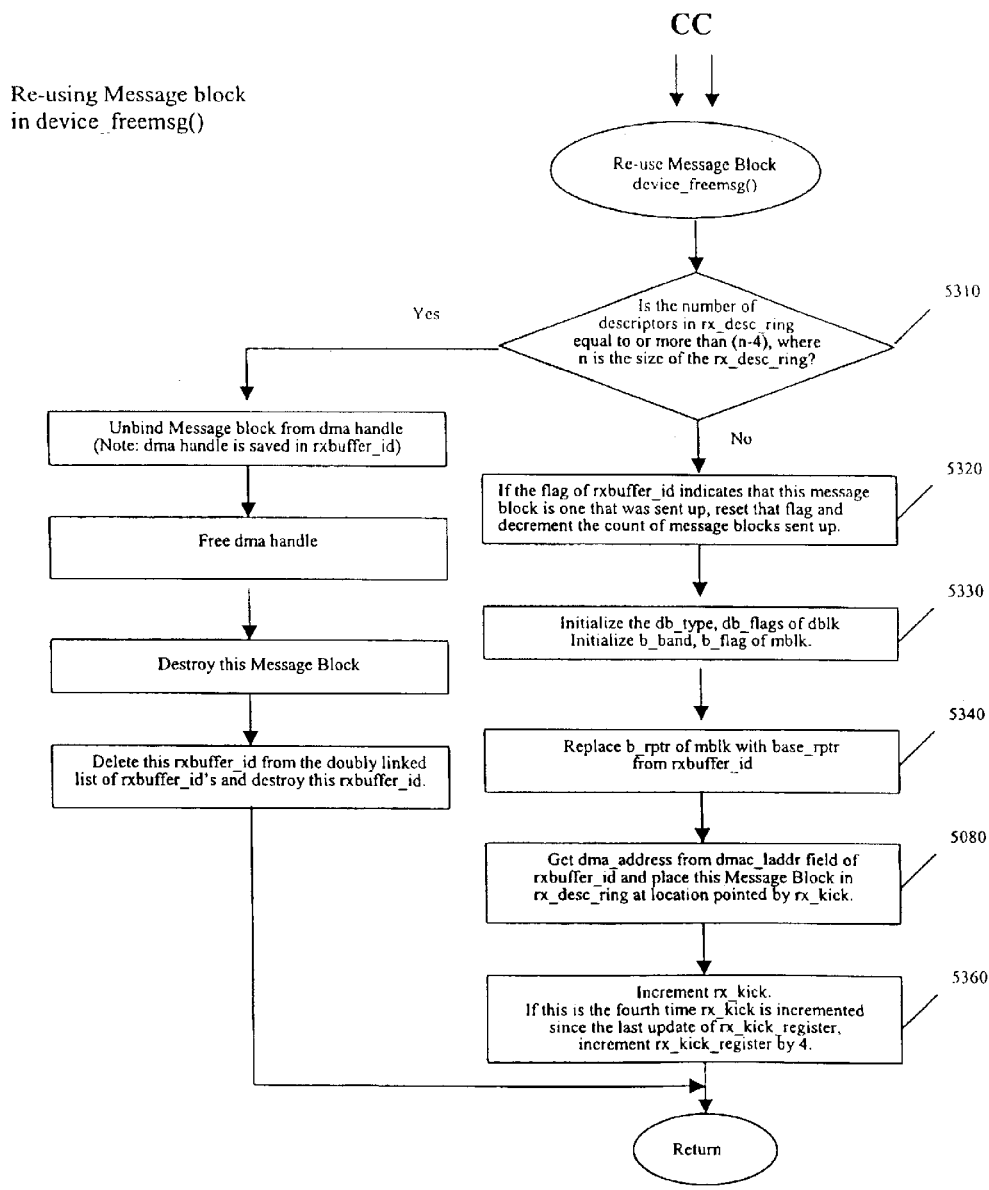
FIG. 5E is an example flow chart of reusing message blocks in the embodiment of FIG. 5D.

Once the STREAMS has delivered the packet to the application layer, it calls the function pointed to by the db_lastfree field of the dblk data structure. Since this field is pointing to device_freemsg( ), all the tasks required for reusing the message block must be done in this device_freemsg( ) function. Referring now to FIG. 5E, the following are the tasks that are recommended in the device_freemsg( ):

1. Check the number of descriptors in the rx_descriptor ring. If this number is equal to or more than (n-4), where n is the maximum size of the rx_descriptor ring, there is no need to reuse this message block and, therefore, this message block may be destroyed. Destroying a message block is done by replacing the db_lastfree field of the dblk data structure with the db_lastfree of the rxbuffer_id and calling STREAMS' freemsg( ) function. Whenever a message block is destroyed, its corresponding rxbuffer id is deleted from the doubly linked list of rxbuffer_id's and then destroyed by calling kmem_free( ). It is also essential that dma-unbinding is done and DMA handle is freed prior to destroying a message block and rxbuffer_id (5310).

2. If the flag field of the rxbuffer_id indicates that this message block is one that is sent up, reset this flag and decrement the count of message blocks that have been sent up (5320).

3. Initialize the db_type and db_flags of the dblk and b_band and b_flag of the mblk (5330).

4. Replace the b_rptr of the mblk with the base_rptr of the rxbuffer_id (5340).

5. Use the dmac_laddr field of the rxbuffer_id to put this message block back into the rx_descriptor ring (PUT_RMD) (5080).

6. Increment rx_kick. If this is the fourth time rx_kick is incremented since the last update of the rx_kick_register, increment rx_kick_register by 4 (5360).

Routing Packets

Figure 5F:
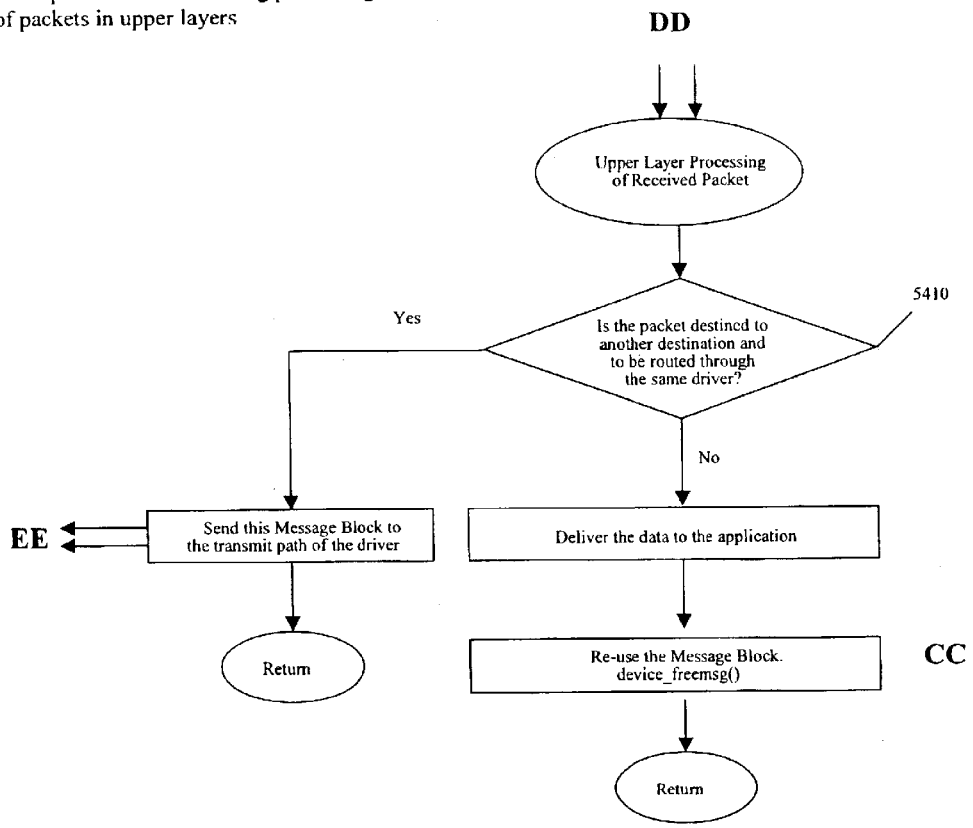
FIG. 5F is an example flow chart of upper layers (modules) processing the data packets in the embodiment of FIG. 5C.
Figure 5G:
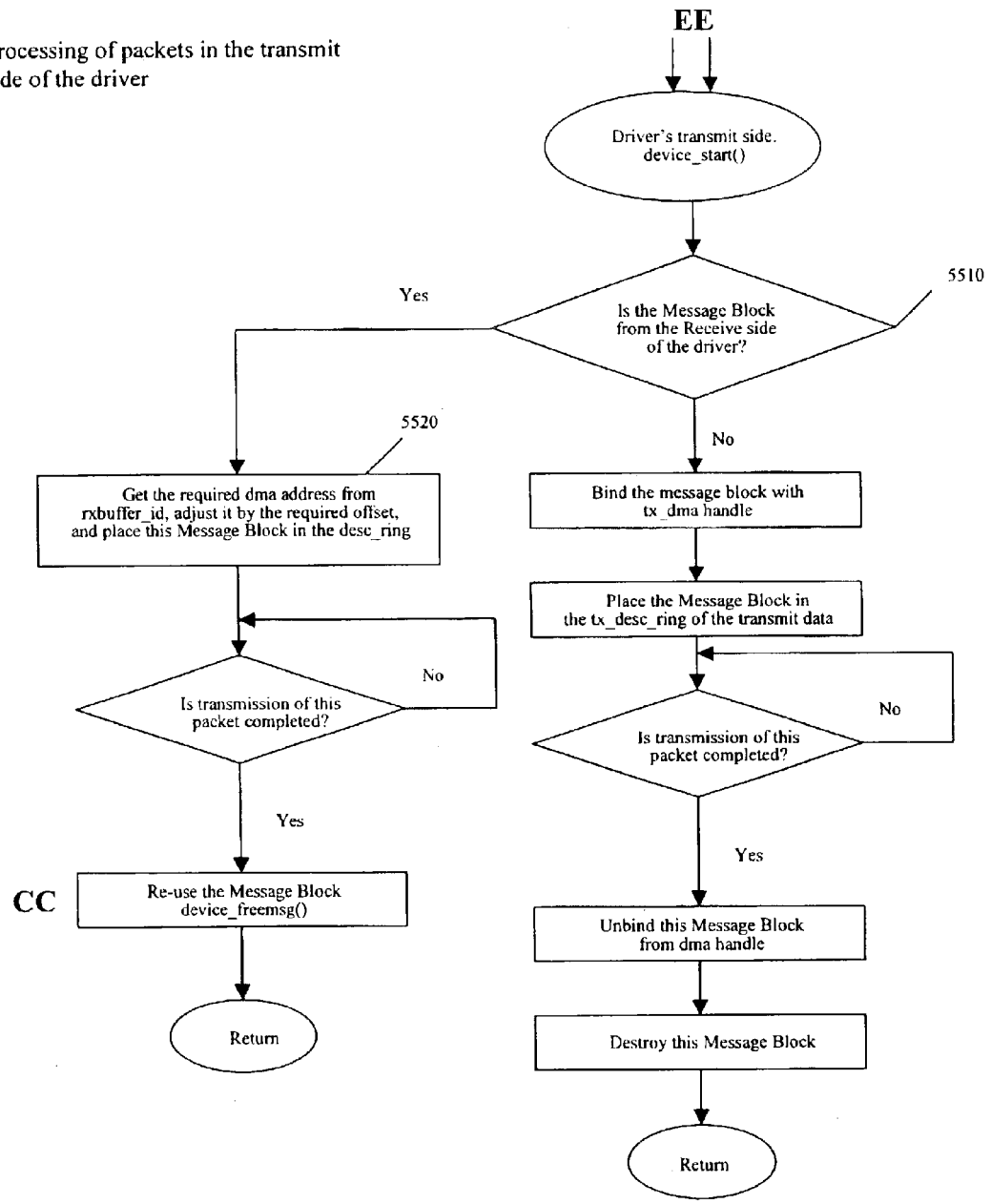
FIG. 5G is an example flow chart of the processing of packets in a transmit side of the embodiment of FIG. 5F.

Referring now to FIGS. 5F and 5G, if the host machine is set up to route packets, there is a possibility that a received packet may come to the transmit path of the driver (5410). If a message block with attached rxbuffer_id arrives on the transmit path, the task involved in placing this message block in the tx_descriptor ring of the DMA engine is much simpler. The following are the additional steps to be performed on every packet that is transmitted through the transmit path of the driver:

1. Check if the db_lastfree field of the dblk data structure is pointing to device_freemsg( ). If not, the data packet is not a message block from the receive path, a rxbuffer_id is not attached to the message block, and this data is processed in the transmit path packet (in the normal way a packet is processed) (5510).

2. If the db_lastfree is pointing to device freemsg( ), the system gets the dmac_laddr from the rxbuffer_id and adjust the message block with the difference between b_rptr of mblk and base_rptr of rxbuffer_id, and use this as the DMA address to place the message block in the tx_descriptor ring of the DMA engine (5520).

It should also be required that the device's reclaim( ) function in the transmit path should not try to do a ddi_dma_addr_unbind( ) if the dblk's db_lastfree is found to be pointing to device freemsg( ).

In addition, the above technique may also be extended to route packets that arrive from other network device drivers such as Cassini Ethernet (CE) driver (1 Gigabits per second), Happy Meal Ethernet (HME) driver (10/100 Megabits per second), and Quad Fast Ethernet (QFE) driver (Four channels of 10/100 Megabits per second), for example, by adding additional fields in rxbuffer_id.

Freeing Message Blocks at the Time of Detaching the Device

Before the device should be detached, the system should be required to check that all the message blocks that are sent up are released by the upper layers. Accordingly, prior to detaching the device, the system should use the interrupt service routine to stop sending message blocks up to the upper layers and wait until the count of message blocks sent up has reached 0. When all the message blocks are released by the upper layers, the system should destroy all the remaining message blocks in the rx_descriptor ring by replacing the db_lastfree pointer of the dblk data structure with its original value from db_lastfree field of the rxbuffer_id, and calling STREAMS' freemsg( ). rxbuffer_id data structure is also destroyed whenever a message block is destroyed. If, on the other hand, the driver finds that the upper layers have not released all the message blocks, it may walk through the doubly linked list of rxbuffer_id's and delink them from dblk, unbind from dma, free dma handle, and then destroy those rxbuffer_id's Example of an Implementation In one embodiment, the present invention is implemented with an ERI network device driver of a Sun Solaris operating system (e.g., Sun Solaris 8 or 9). ERI is a Fast Ethernet device used in Sun SPARC Solaris platforms, such as SunBlade 100 (Grover), Sun Blade 1000 (Excalibur), Netra TI-AC200, SunFire 280 (Littleneck) and SunFIre 880 (Daktari). ERI uses a Sun ASIC that is referred to as RIO. This chip is mainly found on the motherboard of the above named platforms. The ERI device driver provides all the functionalities such as hardware initialization, packet transmit/receive, multicast and promiscuous support and dlpi interface.

Moreover, an embodiment of the invention can be implemented as computer software in the form of computer readable program code executed in a general purpose computing environment, in the form of bytecode class files executable within a Java™ run time environment running in such an environment; in the form of bytecodes runing on a processor (or devices enabled to process bytecodes) existing in a distributed environment (e.g., one or more processors on a network); as microprogrammed bit-slice hardware; as digital signal processors; or as hard-wired control logic.

An embodiment of the invention can be implemented within a client/server computer system. In this system, computers can be categorized as two types: servers and clients. Computers that provide data, software and services to other computers are servers; computers that are used to connect users to those data, software and services are clients. In operation, a client communicates, for example, requests to a server for data, software and services, and the server responds to the requests. The server's response may entail communication with a file management system for the storage and retrieval of files.

Figure 6:
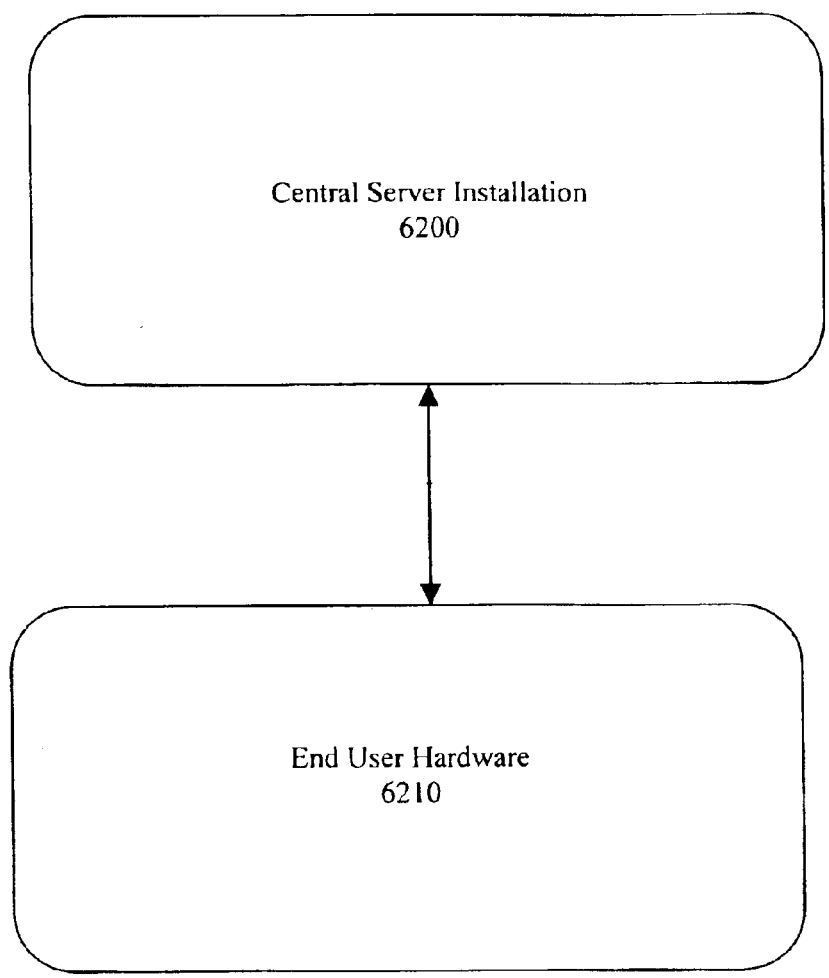
FIG. 6 is a block diagram of an example of a thin client topology called a virtual desktop system architecture in accordance with one embodiment of the present invention.

One embodiment of the invention is used as part of a thin client architecture system. FIG. 6 shows an example of a thin client topology called a virtual desktop system architecture. The virtual desktop system architecture provides a re-partitioning of functionality between a central server installation 6200 and end user client hardware 6210. At the user client end, all functionality is eliminated except that which generates output to the user (e.g., display and speakers) and takes input from the user (e.g., mouse and keyboard) or other peripherals with which the user may interact (e.g., scanners, cameras, removable storage, etc.). The output is provided to a terminal referred to here in as a "Human Interface Device" (HID). The HID is capable of receiving and displaying the data. All computing services are done by the central server installation 6200 and the computing services are done independently of the destination of the data being generated.

Figure 7:
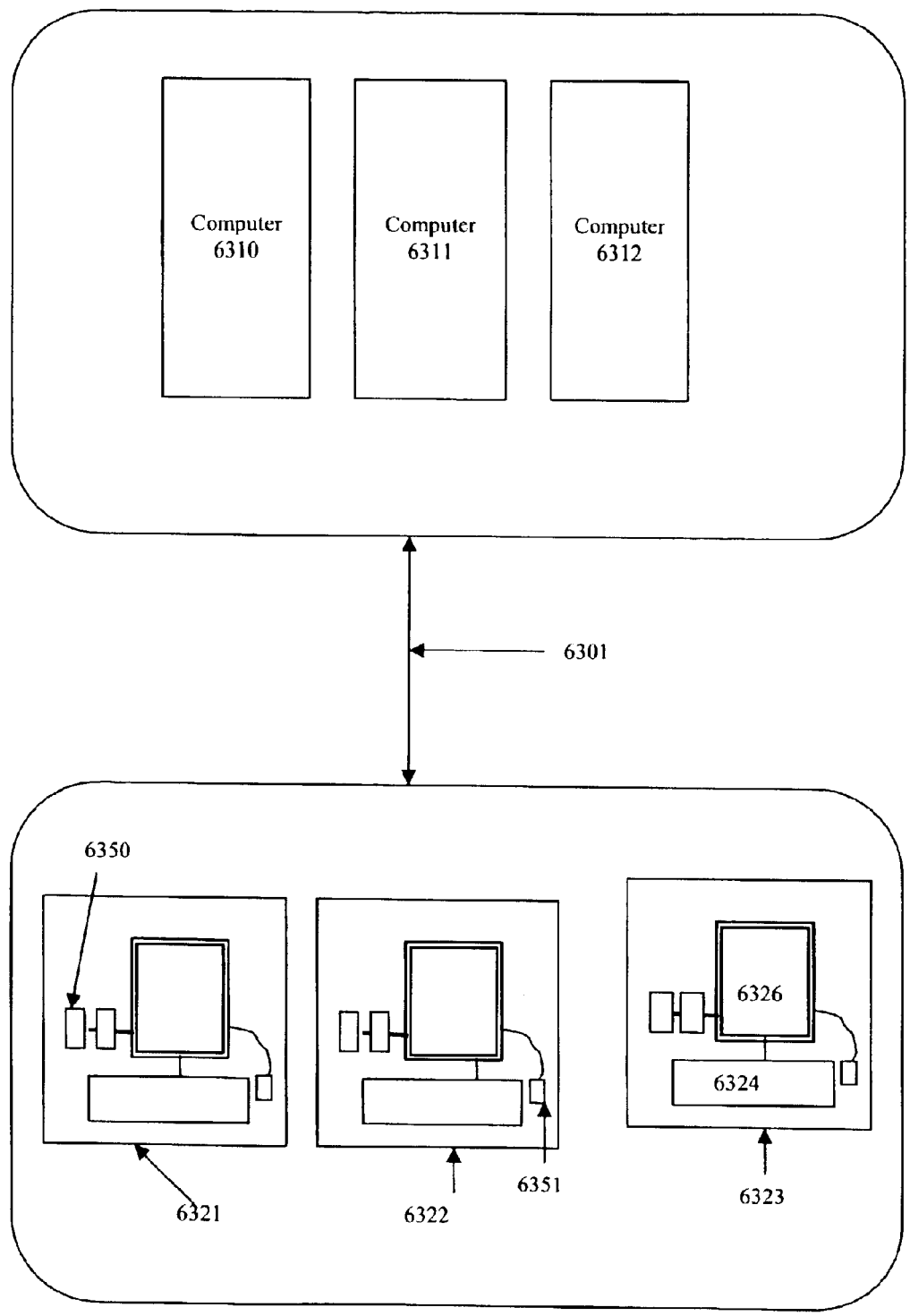
FIG. 7 is a block diagram of a system wherein one or more services communicate with one or more Human Interface Devices (HIDs) through a communication link, such as a network, in accordance with one embodiment of the present invention.

The computing services are not tied to a specific computer, but may be distributed over one or more traditional desktop systems, such as described in connection with FIG. 7, or with traditional servers. One computer may have one or more services and a service may be implemented by one or more computers. The services are provided to HID's and the services are under the control of a common authority or manager. In FIG. 7, the services are provided by computers 6310, 6311, and 6312.

The computer system (providing the services) can connect directly to the HID's through the interconnect fabric. It is also possible for the service producer to be a proxy for another device providing the computational service, such as a file server computer in a three-tier architecture, where the proxy computer might only generate queries and execute user interface code.

The interconnect fabric can comprise any of multiple, suitable communication paths for carrying data between the services and the HID's. In one embodiment the interconnect fabric is a local area network implemented as an intranet or Ethernet network. Any other local network may also be utilized. The invention also contemplates the use of wide area networks, the Internet, the World Wide Web, and others. The interconnect fabric may be implemented with a physical medium, such as a wire or fiber optic cable, or it may be implemented in a wireless environment.

In general, the Internet is referred to as an unstructured network system that uses Hyper Text Transfer Protocol (HTTP) as its transaction protocol. An internal network, also known as an intranet, comprises a network system within an enterprise. The intranet within an enterprise is typically separated from the Internet by a firewall. Basically, a firewall is a barrier to keep destructive services on the public Internet away from the intranet.

The internal network 6301 (e.g., the intranet) provides actively managed, low-latency, high-bandwidth communication between the HID and the services being accessed. One embodiment contemplates a single-level, switched network with cooperative (as opposed to competing) network traffic. Dedicated or shared communication interconnects may be used in the present invention.

The HID allows users to access the computational services provided by the services. FIG. 7 illustrates, HID's 6321, 6322 and 6323. Each HID comprises a display 6326, a keyboard 6324, a mouse 6351, and audio speakers 6350. The HID includes the electronics needed to interface these devices to the internal network 6301 and to transmit to and receive data from the services.

Figure 8:
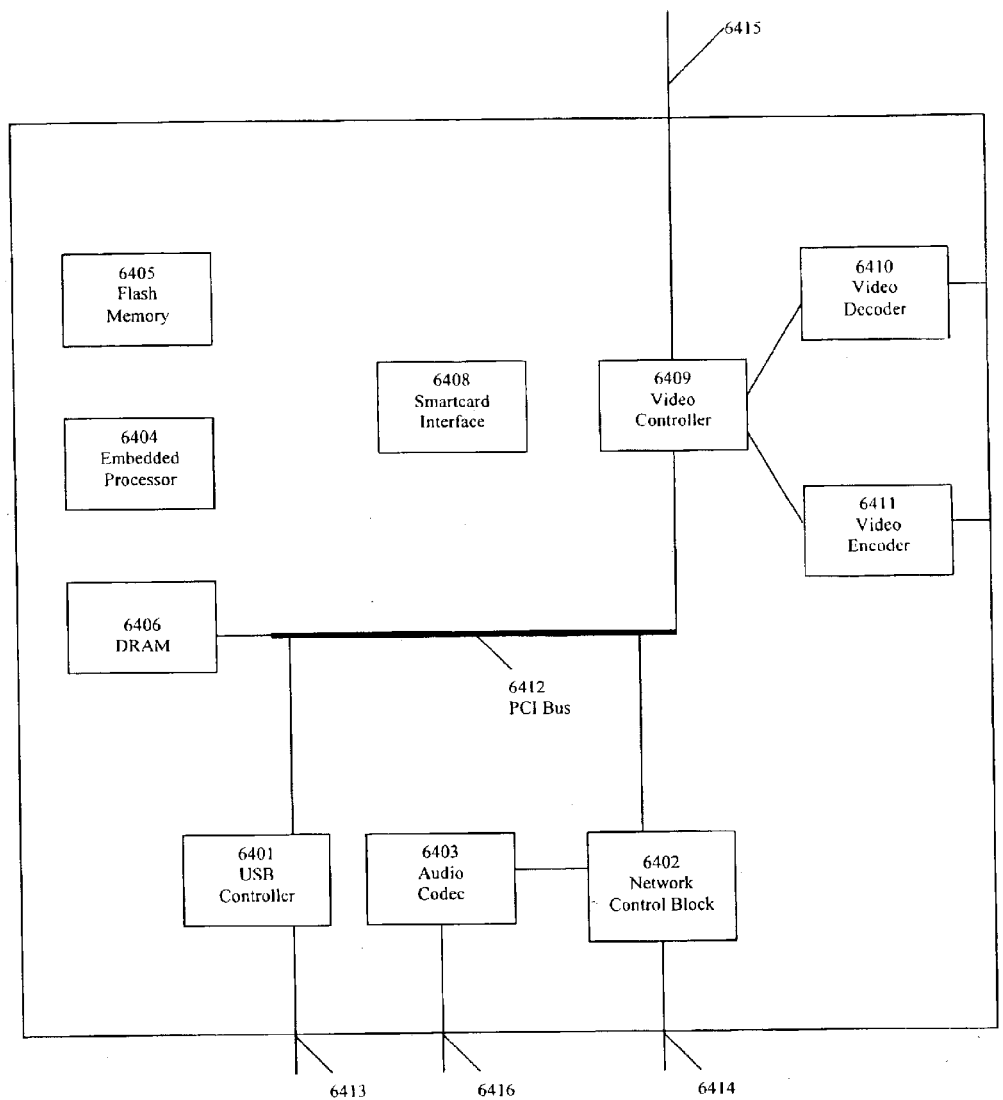
FIG. 8 is a block diagram of an example embodiment of the HID in accordance with one embodiment of the present invention.

A block diagram of an example embodiment of the HID is illustrated in FIG. 8. The components of the HID are coupled internally to a PCI bus 6412. Network control block 6402 communicates to the internal network, such as an Ethernet or intranet, through line 6414. An audio codec 6403 receives audio data on interface 6416 and is coupled to network control block 6402. USB data communication is provided on lines 6413 to a USB controller 6401. The HID further comprises an embedded processor 6404 such as a Sun Microsystems Sparc2ep with coupled flash memory 6405 and DRAM 6406. The USB controller 6401, the network control block 6402 and the embedded processor 6404 are all coupled to the PCI bus 6412. A video controller 6409, also coupled to the PCI bus 6412, can include an ATI RagePro+frame buffer controller, which provides SVGA output on the line 6415. NTSC data is provided in and out of the video controller through video decoder 6410 and encoder 6411, respectively. A smartcard interface 6408 may also be coupled to the video controller 6409.

Figure 9:
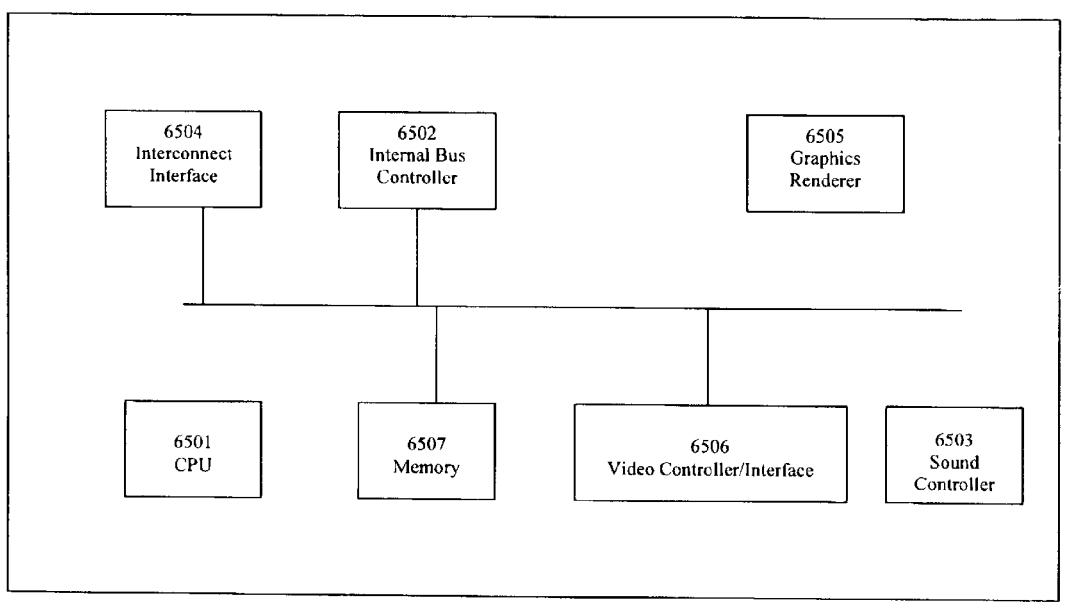
FIG. 9 is a block diagram of a single-chip implementation of an HID in accordance with one embodiment of the present invention.

Alternatively, the HID can comprise a single chip implementation, as illustrated in FIG. 9. The single chip includes the necessary processing capability implemented via CPU 6501 and graphics renderer 6505. Chip memory 6507 is provided along with video controller/interface 6506. An internal bus (USB) controller 6502 is provided to permit communication to a mouse, a keyboard and other local devices attached to the HID. A sound controller 6503 and an interconnect interface 6504 are also provided. The video interface shares memory 6507 with the CPU 6501 and graphics renderer 6505. The software used in this embodiment may reside locally in non-volatile memory, or it can be loaded through the interconnection interface when the device is powered.

The computer systems described above are for purposes of example only. An embodiment of the invention may be implemented in any type of computer system or programming or processing environment.

Having thus described embodiments of the present invention, it should be apparent to those skilled in the art that certain advantages of the within system have been achieved. It should also be appreciated that various modifications, adaptations, and alternative embodiments thereof may be made within the scope and spirit of the present invention. For example, the management of message blocks for a ERI network device driver have been illustrated, but it should be apparent that the inventive concepts described above would be equally applicable to other types of network device drivers. The invention is further defined by the following claims.

What is claimed is:

1. A computer network system for managing memory buffers comprising:

a network for transmitting a data packet;

a first module for receiving said data packet from said network;

a second module for processing said data packet;

an operating system connected with said first and second modules;

an extended message block for carrying said data packet from said first module to said second module, said extended message block comprising:
a standard message block; and
a memory block linked to said standard message block, wherein said memory block saves certain parameters of said standard message block and wherein said saved parameters allow said extended message block to be reused; and a network device driver module within said operating system for assembling said extended message block;

wherein said extended message block can be reused to carry another data packet from said first module to said second module upon delivery of said data packet to said second module.

2. The computer network system of claim 1, wherein said extended message block comprises an extension identifying that said extended message block is to be reused.

3. The computer network system of claim 1, wherein said extended memory block further comprises a pointer pointing to said standard message block.

4. The computer network system of claim 3, wherein said extended memory block further comprises:
- a second pointer pointing to a previous message block assembled before said extended memory block; and
- a third pointer pointing to a subsequent memory block assembled after said extended memory block.

5. The computer network system of claim 3, wherein said extended memory block further comprises a second pointer for detaching said network device driver module from an application layer.

6. The computer network system of claim 3, wherein said extended memory block comprises a flag indicating how to process said extended message block.

7. The computer network system of claim 1, wherein said extended message block comprises a pointer routing said extended message block to one of a path comprising an application path and a transmit path.

8. The computer network system of claim 7, wherein said second module further comprises an application layer and wherein said first module comprises said network device driver.

9. The computer network system of claim 1, wherein said network device driver allocates a new extended message block whenever a threshold value has been met.

10. The computer network system of claim 9, further comprising a descriptor ring having a predetermined memory size and wherein said threshold value comprises said predetermined memory size.

11. The computer network system of claim 1, wherein said network device driver destroys said extended message block whenever a maximum value has been met.

12. The computer network system of claim 11, further comprising a descriptor ring having a predetermined memory size and wherein said maximum value comprises said predetermined memory size minus four.

13. The computer network system of claim 1, wherein said operating system further comprises a STREAMS operating system.

14. A method for managing memory buffers in a computer network system, the method comprising:
- receiving a data packet from a network;
- assembling a standard message block for said data packet;
- extending said standard message block for reuse;
- filling said data packet into said extended message block;
- carrying said extended message block within a network subsystem until said data racket has been delivered to an application layer; and
- reusing said extended message block to carry another data packet;
- wherein said step of assembling said extended message block comprises:
  - initializing said extended message block to receive said data packet;
  - allocating said extended message block; and
  - placing said extended message block into a descriptor ring.

15. The method of claim 14, wherein said extended message block can be reused when said data packet has been delivered to said application layer.

16. The method of claim 14, wherein said step of carrying said extended message comprises:
- sending said extended message block to an upper layer for processing said data packet;
- determining if a number of descriptors in a descriptor ring is below a threshold value; and
- allocating a new extended message block if said number is below said threshold value.

17. The method of claim 14, wherein said step of reusing said extended message block comprises:
- determining if a number of descriptors in a descriptor ring is above a maximum value; and
- reusing said extended message block if said number is below said maximum value.

18. The method of claim 17, further comprising destroying said extended message block if said number of descriptors in said descriptor ring is not below said maximum value.

19. The method of claim 17, wherein said maximum value comprises a maximum number of descriptors in said descriptor ring.

20. The method of claim 19, wherein said maximum value is determined by subtracting said maximum number of descriptors by four.

21. The method of claim 14, wherein said step of extending said message block comprises:
- linking said standard message block with a data structure; and
- using said data structure to indicate that said linked message block is to be reused.

22. A computer network system for managing memory buffers comprising:
- a network for transmitting a data packet;
- an operating system comprising a modular subsystem;
- an extended message block for carrying said data packet within said modular subsystem;
- a network device driver module within said modular subsystem for assembling said extended message block; and
- an application layer connected with said network via said operating system;
- wherein said data packet is delivered to said application layer through said subsystem; and
- wherein said extended message block comprises an extension that allows said extended message block to carry another data packet from said network device driver module to said application layer, upon delivery of said data packet to said application layer.

23. The computer network system of claim 22, wherein said extension comprises an identifier to indicate that said extended message block is not to be destroyed.

24. A computer readable medium storing instructions that, when executed by a computer, cause the computer to perform a method for managing memory buffers in a computer network system, the method comprising:
- receiving a data packet from a network;
- assembling a standard message block for said data packet;
- extending said standard message block for reuse;
- filling said data packet into said extended message block;
- carrying said extended message block within a network subsystem until said data packet has been delivered to an application layer; and
- reusing said extended message block to carry another data packet;
- wherein said step of assembling said extended message block comprises:
  - initializing said extended message block to receive said data packet;
  - allocating said extended message block; and
  - placing said extended message block into a descriptor ring.

* * * * *

UNITED STATES PATENT AND TRADEMARK OFFICE
CERTIFICATE OF CORRECTION

PATENT NO. : 6,826,634 B2
DATED : November 30, 2004
INVENTOR(S) : Raman Viswa Nath It is certified that error appears in the above-identified patent and that said Letters Patent is hereby corrected as shown below:

<u>Column 15,</u>
Line 51, replace "racket" with -- packet; --.

Signed and Sealed this

Seventh Day of June, 2005

JON W. DUDAS
*Director of the United States Patent and Trademark Office*